United States Patent Office 3,284,441
Patented Nov. 8, 1966

3,284,441
PROCESS OF PREPARING CARBOXYMETHYL-
CELLULOSE
Robert G. Bishop and William R. Simmons, Hopewell,
Va., assignors to Hercules Incorporated, a corporation
of Delaware
No Drawing. Filed July 26, 1965, Ser. No. 475,007
4 Claims. (Cl. 260—231)

The present application is a continuation-in-part of our copending application Serial No. 156,169, filed November 30, 1961, and now abandoned, and entitled Manufacture of Polysaccharide Ethers.

The present invention relates to the manufacture of carboxymethylcellulose (CMC) by an alkaline slurry process wherein at least a portion of the alkali is chemically consumed by the etherification reaction.

The amounts of reagent referred to herein are on the basis of employing sodium hydroxide as the alkali and monochloroacetic acid (MCA) as the etherifying agent. As is well known, these amounts of alkali may vary somewhat depending on the particular alkali and etherifying reagent employed. Although MCA is the preferred etherifying agent, its alkali metal salts are also applicable.

In the preparation of CMC it is known that the presence of an alkali is essential both prior to etherification and during etherification. It is likewise known that there must be good contact between the cellulosic material and the liquids employed. CMC has been prepared by various processes, the typical ones of which will now be discussed briefly in order to enable one to better understand the present invention.

One such process is the slurry process, wherein both the alkali cellulose preparation and subsequent etherification are carried out in the presence of an aqueous alkaline medium containing as an inert organic diluent such a material as a lower aliphatic alcohol.

Another type process is often called the dough or semi-dry process. The dough process is like the slurry process except that no etherification diluent is used, so that as soon as the product reaches a water-soluble state the reaction mixture becomes a heavy dough.

Still another type process is known in the art as the steep-press process. Like the dough process, the steep-press process employs no diluent in the alkali cellulose period. In the steep-press process the cellulose is steeped in alkali and then some of the alkali is pressed out before etherifying.

In all conventional processes, including the three types discussed hereinbefore, it is well known that the amount of alkali required for preparing acceptable alkali cellulose is substantially in excess of that chemically consumed during the etherification reaction in preparing CMC of a degree of substitution (D.S.) up to about 0.75. Even in the steep-press process, the amount of alkali remaining after pressing the alkali cellulose is also substantially in excess of that chemically used up during etherification. It is likewise well known that in making CMC two moles of alkali are chemically consumed during etherification for each mole of MCA etherifying agent employed. This is shown by the following equation:

RcellOH+NaOH⇌RcellOH·NaOH
ClCH₂COOH+NaOH⇌ClCH₂COONa+H₂O
RcellOH·NaOH+ClCH₂COONa→
    RcellOCH₂COONa+NaCl+H₂O
NaOH+ClCH₂COONa→HOCH₂COONa+NaCl Thus, one mole of NaOH is used up in converting one mole of monochloroacetic acid to its sodium salt. When one mole of the sodium salt of MCA reacts with cellulose to form CMC or with NaOH to form HOCH₂COONa, another mole of NaOH is used up forming NaCl. Thus, the amount of alkali consumed during the etherification is represented by the following equation:

$$1 \text{ gram MCA} = \frac{80.0}{94.5} \text{ gram NaOH}$$

i.e. 1 gram MCA=0.85 gram NaOH.

All known processes of making water-soluble CMC, including the three processes discussed hereinbefore, employ an amount of alkali during etherification substantially in excess of the amount of alkali chemically consumed during etherification in preparing CMC of a D.S. up to about 0.75.

In accordance with the present invention it has been found that in preparing CMC by the slurry process substantially improved results are obtained by employing an adequate amount of alkali in the alkali cellulose period to properly condition the cellulose for etherification, and then substantially reducing this amount of alkali for the etherification step. More specifically, it has been found that the benefits of this invention are realized in the slurry process by carrying out the process which comprises contacting cellulosic material with an alkali, the amount of alkali being substantially in excess of the amount chemically used up during the subsequent etherification of the resulting alkali cellulose, reducing the amount of alkali used in the alkali cellulose period preferably to only slightly in excess of the amount chemically used up during the etherification, and then etherifying said alkali cellulose.

The improvements realized by practicing the process of the present invention are measured herein principally in terms of improved solution properties of the water-soluble CMC product. There are many important applications for CMC in which it must be uniformly substituted during preparation in order to have good solution properties. For instance, its salt tolerance must be high in order to give the desired viscosity in the presence of salts, e.g. sodium chloride as experienced in certain oil wells where CMC is used as a drilling mud aid, or sodium chloride as experienced in certain materials, e.g. foods, where CMC is used as a thickener. Good solution properties are essential in sizing, in solutions used for preparing films, and the like.

Salt tolerance is determined by measuring the viscosity of the CMC in aqueous sodium chloride solution as compared with the viscosity of the CMC in water. In the examples hereinafter, we have used the term "viscosity ratio" and this is determined by dividing the viscosity of the water solution of the CMC by the viscosity of the sodium chloride (or other salt used) solution of the CMC. According to the present invention, viscosity ratio is a measure of the smoothness of the solutions, the lower the viscosity ratio number the smoother or the better the solution properties of the CMC. Aqueous solutions of the CMC of the present invention were far superior to those of the prior art. Those of the prior art, particularly at the lower D.S. levels, were very granular, like applesauce, whereas those of the present invention flowed like syrup and showed substantially no granularity as visually observed. In order for any process for manufacturing CMC to be of practical value, it must be economical as well as giving products having good solution properties, the chief factor determining this economy being etherification efficiency.

The products of the present invention give good solution properties in the presence of salts which tend to hinder obtaining the desired viscosity, including e.g. alkali metal and alkaline earth metal salts of organic and inorganic acids. In addition to the chlorides just mentioned they include, for instance, the acetates, citrates, and others.

The present invention is restricted to the slurry process.

It is not applicable to the dough process or to the steep-press process. In attempting to apply the present invention to either the dough process or to the steep-press process (or for that matter to any process other than a slurry process), the problem of reducing the alkali to the necessary level called for by the present invention is such that it renders this invention quite unattractive particularly from a commercial standpoint. There is no known practical way of pressing the alkali out of the alkali cellulose to the reduced level employed in the etherification step of the present invention, also in attempting to practice the present invention in the absence of a diluent, the relative amount of alkali to cellulose is so small that the alkali cannot be contacted with acid adequately to reduce it by neutralization. Neutralization under these conditions is very nonuniform and unacceptable. In some places in the alkali cellulose all of the alkali is neutralized, while in other places none of it is neutralized.

In order to make a good product and in order for the process to be commercially attractive, it is necessary to substantially completely contact all of the cellulose with alkali. In order to accomplish this in processes not employing a diluent, e.g. the dough process and the steep-press process, it is necessary to employ a very large excess of alkali. In the steep-press process some of this excess is pressed out and recovered at the end of the alkali cellulose period. However, the amount of alkali left after pressing is still substantially greater than applicants can tolerate during etherification in accordance with the present invention. In the dough process considerably more alkali is employed than even in the steep-press process and all of the alkali in the alkali cellulose period is employed in the etherification.

The following examples illustrate specific embodiments of the present invention, but they are not intended to limit the invention beyond the scope of the claims of this application. In these examples and elsewhere herein percent is by weight, and the cellulosic material is on an air-dry basis which means it contains about 5% water. In these examples the present invention is compared at several D.S. levels with two other slurry processes, for convenient reference herein called "Process I" and "Process II." In Process I a relatively small amount of alkali was employed in the alkali cellulose period and there was no reduction in alkali for the etherification. In Process II a relatively large amount of alkali was employed in the alkali cellulose period (i.e. the amount required to give good quality alkali cellulose) and there was no reduction in alkali for the etherification. In the "Present" process, i.e. the process according to the present invention, a relatively large amount of alkali was employed in the alkali cellulose period (i.e. the amount required to give good alkali cellulose) but the etherification was carried out in the presence of a substantially smaller amount of alkali, this smaller amount of alkali being obtained by neutralizing a portion of the alkali with acetic acid after the alkali cellulose period.

In each of the examples the same general procedure was used as follows: 87% isopropyl alcohol (IPA) used as diluent was mixed with 71.5% sodium hydroxide and the mixture cooled to 15° C. Comminuted cellulose, having a particle size sufficiently small to pass through the openings in a 35 mesh U.S. Standard Series Screen, was stirred in the mixture for 2 hours at 15° C. Then monochloroacetic acid (MCA) was dissolved in additional IPA (one gram MCA/ml. IPA) and mixed with the slurry at the end of the alkali cellulose period. In these particular examples if glacial acetic acid (HOAc) were used to reduce the excess sodium hydroxide, it was combined with the MCA-IPA mixture and mixed with the slurry at the end of the alkali cellulose period, this particular procedure being used only as a matter of convenience. The etherification reaction was carried out at 70° C. for 1.5 hours. The slurry was cooled to about room temperature (25° C.–30° C.), the sodium hydroxide was neutralized with acetic acid and the crude CMC product was purified with aqueous alcohol prior to hardening with anhydrous methanol and drying. Moderate agitation was used throughout the entire process. A one percent aqueous solution of the final CMC product was prepared and analyzed. Further details are given in Tables 1–7 which follow.

TABLE 1.—EXAMPLES 1 AND 2

| Example No | 1 | 2 |
|---|---|---|
| Operating Conditions: | | |
| Process | Present | Prior Art I |
| Cellulose, grams | 125 | 125 |
| Diluent, ml.: | | |
| IPA | 1,450 | 1,450 |
| H₂O | 150 | 150 |
| 71.5% NaOH, grams | 101 | 32.3 |
| Flake MCA, grams | 30 | 25.2 |
| 87% IPA, ml | 30 | 25 |
| HOAc, grams | 65.4 | None |
| Product Properties: | | |
| D.S. | 0.28 | 0.29 |
| 1% Viscosity, cps | 5,350 | (¹) |
| 1% Viscosity, cps. in— | | |
| 0.25% NaCl soln | 70 | (¹) |
| 0.50% NaCl soln | 50 | (¹) |
| 0.75% NaCl soln | 40 | (¹) |
| Viscosity ratio: | | |
| 0.25% NaCl soln | 76.4 | (¹) |
| 0.50% NaCl soln | 107 | (¹) |
| 0.75% NaCl soln | 134 | (¹) |

¹ Insoluble.

TABLE 2.—EXAMPLES 3–6

| Example No | 3 | 4 | 5 | 6 |
|---|---|---|---|---|
| Operating conditions: | | | | |
| Process | Prior Art I | Prior Art II | Present | Present |
| Cellulose, grams | 125 | 125 | 125 | 125 |
| Diluent, ml.: | | | | |
| IPA | 1,450 | 1,450 | 1,450 | 1,450 |
| H₂O | 150 | 150 | 150 | 150 |
| 71.5% NaOH, grams | 39.9 | 101 | 101 | 101 |
| Flake MCA, grams | 31.2 | 41.3 | 35.0 | 34.4 |
| 87% IPA, ml | 31 | 41 | 35 | 34 |
| HOAc, grams | None | None | 55.0 | 38.4 |
| Product Properties: | | | | |
| D.S. | 0.36 | 0.37 | 0.38 | 0.38 |
| 1% Viscosity, Cps | (¹) | 5,000 | 3,270 | 4,300 |
| 1% Viscosity, cps. in— | | | | |
| 0.25% NaCl soln | (¹) | 2,100 | 3,000 | 3,700 |
| 0.50% NaCl soln | (¹) | 170 | 1,940 | 1,300 |
| 0.75% NaCl soln | (¹) | 60 | 850 | 600 |
| Viscosity ratio: | | | | |
| 0.25% NaCl soln | (¹) | 2.4 | 1.1 | 1.2 |
| 0.50% NaCl soln | (¹) | 29.4 | 1.7 | 3.3 |
| 0.75% NaCl soln | (¹) | 83.3 | 3.8 | 7.2 |

¹ Insoluble.

TABLE 3.—EXAMPLES 7-9

| Example No | 7 | 8 | 9 |
|---|---|---|---|
| Operating Conditions: | | | |
| Process | Prior Art I | Prior Art II | Present |
| Cellulose, grams | 125 | 125 | 125 |
| Diluent, ml.: | | | |
| IPA | 1,450 | 1,450 | 1,450 |
| H₂O | 150 | 150 | 150 |
| 71.5% NaOH, grams | 56 | 101 | 101 |
| Flake MCA, grams | 43.7 | 50 | 43.7 |
| 87% IPA, ml | 44 | 50 | 44 |
| HOAc, grams | None | None | 48.4 |
| Product Properties: | | | |
| D.S. | 0.47 | 0.47 | 0.47 |
| 1% Viscosity, cps | 2,250 | 3,850 | 3,750 |
| 1% Viscosity, cps. in— | | | |
| 0.50% NaCl soln | 85 | 960 | 3,200 |
| 0.75% NaCl soln | 50 | 280 | 1,000 |
| 1.00% NaCl soln | 21 | 89 | 240 |
| Viscosity ratio: | | | |
| 0.50% NaCl soln | 26.5 | 4.0 | 1.2 |
| 0.75% NaCl soln | 45.0 | 13.8 | 3.8 |
| 1.00% NaCl soln | 107.1 | 43.3 | 15.6 |

TABLE 4.—EXAMPLES 10-12

| Example No | 10 | 11 | 12 |
|---|---|---|---|
| Operating Conditions: | | | |
| Process | Prior Art I | Prior Art II | Present |
| Cellulose, grams | 125 | 125 | 125 |
| Diluent, ml.: | | | |
| IPA | 1,450 | 1,450 | 1,450 |
| H₂O | 150 | 150 | 150 |
| 71.5% NaOH, grams | 76.4 | 101 | 101 |
| Flake MCA, grams | 60 | 61.4 | 58 |
| 87% IPA, ml | 60 | 61 | 58 |
| HOAc, grams | None | None | 28.4 |
| Product Properties: | | | |
| D.S. | 0.60 | 0.60 | 0.60 |
| 1% Viscosity, cps | 3,400 | 3,150 | 3,300 |
| 1% Viscosity, cps. in— | | | |
| 0.50% NaCl soln | 600 | 1,170 | 3,700 |
| 0.75% NaCl soln | 220 | 500 | 3,300 |
| 1.00% NaCl soln | 96 | 125 | 1,650 |
| Viscosity ratio: | | | |
| 0.50% NaCl soln | 5.7 | 2.7 | 0.9 |
| 0.75% NaCl soln | 15.6 | 6.3 | 1.0 |
| 1.00% NaCl soln | 35.4 | 25.2 | 2.0 |

TABLE 5.—EXAMPLES 13-15

| Example No | 13 | 14 | 15 |
|---|---|---|---|
| Operating Conditions: | | | |
| Process | Prior Art I | Prior Art II | Present |
| Cellulose, grams | 125 | 125 | 125 |
| Diluent, ml.: | | | |
| IPA | 1,450 | 1,450 | 1,450 |
| H₂O | 150 | 150 | 150 |
| 71.5% NaOH, grams | 79.4 | 101 | 101 |
| Flake MCA, grams | 62.5 | 68.7 | 62.5 |
| 87% IPA, ml | 62 | 69 | 62 |
| HOAc, grams | None | None | 22.6 |
| Product Properties: | | | |
| D.S. | 0.67 | 0.69 | 0.69 |
| 1% Viscosity, cps | 3,300 | 2,900 | 3,100 |
| 1% Viscosity, cps. in— | | | |
| 0.50% NaCl soln | 3,500 | 2,100 | 3,400 |
| 0.75% NaCl soln | 1,800 | 1,700 | 3,400 |
| 1.00% NaCl soln | 680 | 1,100 | 2,600 |
| Viscosity ratio: | | | |
| 0.50% NaCl soln | 0.9 | 1.4 | 0.9 |
| 0.75% NaCl soln | 1.8 | 1.7 | 0.9 |
| 1.00% NaCl soln | 4.8 | 2.6 | 1.2 |

TABLE 6.—EXAMPLES 16-19

| Example No. | 16 | 17 | 18 | 19 |
|---|---|---|---|---|
| Operating Conditions: | | | | |
| Process | Present | Present | Present | Present |
| Cellulose, grams | 125 | 125 | 125 | 125 |
| Diluent, ml.: | | | | |
| IPA | 1,450 | 1,450 | 1,450 | 1,450 |
| $H_2O$ | 150 | 150 | 150 | 150 |
| 71.5% NaOH, grams | 70.0 | 101 | 137 | 350 |
| Flake MCA, grams | 31.2 | 26.5 | 61.5 | 77.0 |
| 87% IPA, ml | 31 | 26 | 61 | 77 |
| HOAc, grams | 19.7 | 49.1 | 14.5 | 180.7 |
| Product Properties: | | | | |
| D.S. | 0.35 | 0.30 | 0.62 | 0.72 |
| 1% Viscosity, cps | 3,900 | 4,800 | 3,000 | 2,900 |
| 1% Viscosity, cps. in— | | | | |
| 0.25% NaCl soln | 3,000 | 240 | 3,300 | 3,200 |
| 0.50% NaCl soln | 2,150 | 95 | 3,300 | 3,200 |
| 0.75% NaCl soln | 1,700 | 60 | 3,000 | 3,200 |
| Viscosity Ratio: | | | | |
| 0.25% NaCl soln | 1.3 | 20 | 0.9 | 0.9 |
| 0.50% NaCl soln | 1.8 | 51 | 0.9 | 0.9 |
| 0.75% NaCl soln | 2.3 | 80 | 1.0 | 0.9 |

TABLE 7.—SUMMARY

| Example No. | 1 | 2 | 3 | 4 | 5 | 6 | 7 | 8 | 9 |
|---|---|---|---|---|---|---|---|---|---|
| Process | Present | I | I | II | Present | Present | I | II | Present |
| D.S. | 0.28 | 0.29 | 0.36 | 0.37 | 0.38 | 0.38 | 0.47 | 0.47 | 0.47 |
| Cellulose, grams | 125 | 125 | 125 | 125 | 125 | 125 | 125 | 125 | 125 |
| Initial NaOH, grams | 72.2 | 23.1 | 28.5 | 72.2 | 72.2 | 72.2 | 40.0 | 72.2 | 72.2 |
| HOAc, grams | 65.4 | None | None | None | 55.0 | 38.4 | None | None | 48.4 |
| MCA, grams | 30.0 | 25.2 | 31.2 | 41.3 | 35.0 | 34.4 | 43.7 | 50.0 | 43.7 |
| NaOH neutralized by HOAc, grams | 43.6 | None | None | None | 36.7 | 25.6 | None | None | 31.9 |
| NaOH consumed by MCA, grams | 25.4 | 21.4 | 26.5 | 35.1 | 29.6 | 29.1 | 37.1 | 42.5 | 37.1 |
| Residual NaOH, grams | 3.2 | 1.7 | 2.0 | 37.1 | 5.9 | 17.5 | 2.9 | 29.7 | 3.2 |
| Weight ratios to cellulose: | | | | | | | | | |
| Initial NaOH | 0.578 | 0.185 | 0.228 | 0.578 | 0.578 | 0.578 | 0.32 | 0.578 | 0.578 |
| NaOH neutralized by HOAc | 0.348 | None | None | None | 0.294 | 0.205 | None | None | 0.255 |
| NaOH consumed by MCA | 0.204 | 0.171 | 0.212 | 0.281 | 0.236 | 0.233 | 0.297 | 0.340 | 0.297 |
| Residual NaOH | 0.026 | 0.014 | 0.016 | 0.297 | 0.047 | 0.140 | 0.023 | 0.238 | 0.026 |

TABLE 7.—SUMMARY—Continued

| Example No. | 10 | 11 | 12 | 13 | 14 | 15 | 16 | 17 | 18 | 19 |
|---|---|---|---|---|---|---|---|---|---|---|
| Process | I | II | Present | I | II | Present | Present | Present | Present | Present |
| D.S. | 0.60 | 0.60 | 0.60 | 0.67 | 0.69 | 0.69 | 0.35 | 0.30 | 0.62 | 0.72 |
| Cellulose, grams | 125 | 125 | 125 | 125 | 125 | 125 | 125 | 125 | 125 | 125 |
| Initial NaOH, grams | 54.5 | 72.2 | 72.2 | 56.8 | 72.2 | 72.2 | 50.0 | 72.2 | 97.8 | 250 |
| HOAc, grams | None | None | 28.4 | None | None | 22.6 | 29.6 | 73.9 | 21.8 | 271 |
| MCA, grams | 60.0 | 61.4 | 58.0 | 62.5 | 68.7 | 62.5 | 31.2 | 26.5 | 61.5 | 77.0 |
| NaOH neutralized by HOAc, grams | None | None | 19.0 | None | None | 14.9 | 19.7 | 49.1 | 14.5 | 180.7 |
| NaOH consumed by MCA, grams | 51.0 | 52.2 | 49.3 | 53.1 | 58.2 | 53.1 | 26.4 | 22.5 | 52.1 | 65.3 |
| Residual NaOH, grams | 3.5 | 20.0 | 3.9 | 3.7 | 13.8 | 4.2 | 3.9 | 0.625 | 31.2 | 4.0 |
| Weight ratios to cellulose: | | | | | | | | | | |
| Initial NaOH | 0.435 | 0.578 | 0.578 | 0.455 | 0.578 | 0.578 | 0.40 | 0.578 | 0.783 | 2.0 |
| NaOH neutralized by HOAc | None | None | 0.152 | None | 0.119 | 0.157 | 0.393 | 0.116 | 1.45 | |
| NaOH consumed by MCA | 0.408 | 0.418 | 0.394 | 0.425 | 0.467 | 0.425 | 0.211 | 0.180 | 0.417 | 0.524 |
| Residual NaOH | 0.028 | 0.160 | 0.031 | 0.030 | 0.111 | 0.033 | 0.031 | 0.005 | 0.250 | 0.032 |

The following equation is given to aid in understanding the present invention, i.e. to more clearly show the relative amounts of sodium hydroxide to cellulose in the various stages of the process:

$$D = A - (B + C)$$

wherein

A represents the initial amount of NaOH.
B represents the amount of NaOH neutralized by adding acetic acid or other acid after the alkali cellulose period.
C represents the amount of NaOH consumed by the MCA both in neutralizing its carboxyl group and in etherifying the cellulose.
D represents the amount of residual NaOH (i.e. the amount of alkali remaining after completion of the etherification reaction).

The function of the amount of alkali represented by B is solely to give good alkali cellulose, and its removal after the alkali cellulose period is necessary in order to realize the benefits of the present invention.

The above-mentioned equation will now be illustrated with reference to Example 1 hereinbefore wherein (as in all the other examples) 125 grams of cellulose was employed:

72.2 g. NaOH was employed in the alkali cellulose preparation $$\left(A = \frac{72.2}{125} = 0.58\right)$$

43.6 g. NaOH was neutralized by the addition of acetic acid $$\left(B = \frac{43.6}{125} = 0.35\right)^*$$

*The 43,6 grams was determined by the equation of $$\text{one gram HOAc} = \frac{40.0}{60.0} \text{ grams NaOH}$$

or 65.4 grams HOAc = 43.6 grams NaOH.

25.4 g. NaOH was consumed by the MCA $$\left(C = \frac{25.4}{125} = 0.20\right)^{**}$$

**The 25.4 grams was calculated from the equation given hereinbefore of $$\text{one gram MCA} = \frac{80.0}{94.5} \text{ grams NaOH}$$

or 30 grams MCA=25.4 grams NaOH.

and 3.2 g. NaOH remained after completion of the etherification reaction $$\left(D = \frac{3.2}{125} = 0.025\right)$$

In accordance with the present invention it has been found that both the initial alkali/cellulose ratio (A in the above equation) and that the residual alkali/cellulose ratio (D in the above equation) are critical. The initial alkali/cellulose ratio may be 0.4/1–2.0/1.0, preferably 0.5/1.0–1.2/1.0. The residual alkali/cellulose ratio may be zero/1.0–0.25/1.0, preferably 0.01/1–0.15/1.0.

In order to compare this invention with other processes, use is made herein of several sets of examples, the D.S. values being different for each set but substantially the same within any given set.

Example 1 in Table 1 hereinbefore illustrates the fact that the present invention provides a way of making water-soluble CMC at a substantially lower D.S. level than heretofore thought possible. Thus, while the D.S. of the CMC prepared according to Example 1 of the present invention was only 0.28, it was soluble in water. On the contrary, the prior art teaches that it is only after the D.S. value of the CMC reaches 0.4 that water solubility begins—see Kirk-Othmer, Encyclopedia of Chemical Technology, Second Edition, 4, 643 (1964), published by Interscience Publishers, Inc. The CMC product of Example 2 in Table 1, prepared by a prior art process, was insoluble in water. It had a D.S. of 0.29.

In Table 2 hereinbefore two processes (Examples 3 and 4) were compared with the present invention (Examples 5 and 6) to make CMC of about 0.37 D.S. In prior art Processes I and II the same amount of alkali was employed in alkali cellulose period as in the etherification, whereas in the present invention process a fairly large amount of alkali (i.e. the amount needed to make good quality alkali cellulose) was employed in the alkali cellulose period, but this amount of alkali was substantially reduced and this reduced amount of alkali was employed for etherification. Prior art Process I employs a fairly small amount of alkali (i.e. less than the amount required to give good quality alkali cellulose) to give very good etherification efficiency, but this efficiency is obtained at the expense of very poor product properties. When (as in prior art Process II) this amount of alkali is increased substantially, the product properties are improved considerably because of better quality alkali cellulose, but this is realized at the expense of poor etherification efficiency. However, when (as in Examples 5 and 6) the process is carried out according to the present invention, we obtain both excellent product properties and high etherification efficiency. Another way of considering our invention is that we employ both the relatively larger amount of alkali required to give good quality alkali cellulose and the relatively smaller amount of alkali during etherification to further improve the product quality and to avoid any substantial sacrifice in etherification efficiency.

Making this same comparison of the examples in Tables 3–6 hereinbefore, it will be seen we have found that this same general pattern applies at higher D.S. values within the scope of this invention. However, the improvements realized by the process of the present invention become less as the D.S. of the product being prepared increases. At a CMC D.S. of about 0.8, the process of the present invention gives no substantial improvement over conventional processes. The reason for this is that the amount of alkali chemically used up during etherification increases with increase in the amount of reagent (e.g. MCA) needed to give the D.S. of the product being prepared, and at about 0.8 D.S. the amount of alkali chemically consumed during etherification is substantially the same as that required to make good alkali cellulose. Below about 0.25 D.S., the CMC made in accordance with the present invention is not as soluble in water as desired. Thus, the D.S. range operable in the present invention is about 0.25–0.75, preferably 0.25–0.70, about 0.25–0.50 being specifically preferred.

The manner in which the reduction in alkali is obtained is not critical, provided the desired reduction is obtained. However, neutralization of the alkali with an acid is the most practical means in most cases. Acids in general are applicable, both inorganic and organic. Common inorganic acids applicable include hydrochloric, nitric and phosphoric. Common organic acids applicable include acetic, propionic and benzoic. We may also use mixed acids. Although the strength of the acid is not critical, for the sake of control during etherification we prefer to use an acid which introduces the least amount of water into the system.

The time and temperature applicable during the alkali cellulose period and during the etherification period are well known in this art and are not per se a part of this invention. The same also applies to such variables as diluents, types of alkali, etc.

Any source of cellulosic material is applicable in the present invention. For instance, we may use the cellulosic material from wood, cotton, grass, straw, etc., preferably in comminuted form obtained, e.g. by shredding, pulping or other forms of comminution by any suitable comminuting means such as knife mills, hammer mills, ball mills, paper beaters, Jordon engines, attrition mills, and the like.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. A slurry process of preparing water-soluble carboxymethylcellulose having a D.S. of 0.25–0.75 that is very uniformly substituted and which in solution has substantially improved salt tolerance, which comprises preparing alkali cellulose, the alkali/cellulose weight ratio range in the alkali cellulose period being 0.4/1.0–2.0/1.0, reducing the amount of alkali to an alkali/cellulose weight ratio range of zero/1.0–0.25/1.0 in excess of that which will be chemically consumed during the etherification, and then etherifying the alkali cellulose in the presence of said reduced amount of alkali.

2. A slurry process of preparing water-soluble carboxymethylcellulose having a D.S. of 0.25–0.75 that is very uniformly substituted and which in solution has substantially improved salt tolerance, which comprises preparing alkali cellulose, the alkali/cellulose weight ratio range in the alkali cellulose period being 0.4/1.0–2.0/1.0, reducing the amount of alkali after the alkali cellulose period to an alkali/cellulose weight ratio range of 0.01/1.0–0.15/1.0 in excess of that which will be chemically consumed during the etherification, and then etherifying the alkali cellulose in the presence of said reduced amount of alkali.

3. A slurry process of preparing water-soluble carboxymethylcellulose having a D.S. of 0.25–0.50 that is very uniformly substituted and which in solution has substantially improved salt tolerance, which comprises preparing alkali cellulose, the alkali/cellulose weight ratio range in the alkali cellulose period being 0.4/1.0–2.0/1.0, reducing the amount of alkali after the alkali cellulose period to an alkali/cellulose weight ratio range of zero/ 1.0–0.25/1.0 in excess of that which will be chemically consumed during the etherification, and then etherifying the alkali cellulose in the presence of said reduced amount of alkali.

4. A slurry process of preparing water-soluble carboxymethylcellulose having a D.S. of 0.25–0.50 that is very uniformly substituted and which in solution has substantially improved salt tolerance, which comprises preparing alkali cellulose, the alkali/cellulose weight ratio range in the alkali cellulose period being 0.5/1.0–1.2/1.0, reducing the amount of alkali after the alkali cellulose period to an alkali/cellulose weight ratio range of 0.01/ 1.0–0.15/1.0 in excess of that which will be chemically consumed during the etherification, and then etherifying the alkali cellulose in the presence of said reduced amount of alkali.

References Cited by the Examiner
UNITED STATES PATENTS

| | | | |
|---|---|---|---|
| 2,517,577 | 8/1964 | Klug | 260—231 |
| 3,131,176 | 8/1950 | Klug et al. | 260—231 |

LEON J. BERCOVITZ, *Primary Examiner.*

R. W. MULCAHY, *Assistant Examiner.*

UNITED STATES PATENT OFFICE
CERTIFICATE OF CORRECTION

Patent No. 3,284,441                          November 8, 1966

Robert G. Bishop et al.

It is hereby certified that error appears in the above numbered patent requiring correction and that the said Letters Patent should read as corrected below.

Column 8, line 72, for "43,6" read -- 43.6 --; column 10, line 62, for "0.4/1.0-2.0/1.0" read -- 0.5/1.0-1.2/1.0 --.

Signed and sealed this 12th day of September 1967.

(SEAL)
Attest:

ERNEST W. SWIDER                          EDWARD J. BRENNER

Attesting Officer                             Commissioner of Patents